United States Patent [19]

Traver

[11] Patent Number: 4,529,758

[45] Date of Patent: Jul. 16, 1985

[54] WATER BASED RESIN DISPERSIONS

[75] Inventor: Frank J. Traver, Troy, N.Y.

[73] Assignee: General Electric Company, Waterford, N.Y.

[21] Appl. No.: 491,793

[22] Filed: May 5, 1983

[51] Int. Cl.$^3$ .............................................. C08K 5/51
[52] U.S. Cl. ..................... 524/43; 524/370; 524/503; 524/506; 524/156; 524/157; 524/46
[58] Field of Search ............... 524/43, 156, 157, 370, 524/503, 506

[56] References Cited

U.S. PATENT DOCUMENTS

| | | | |
|---|---|---|---|
| 3,294,709 | 12/1966 | Nitzsche et al. | 524/506 |
| 4,028,339 | 6/1977 | Merrill | 260/46.5 R |
| 4,052,331 | 10/1977 | Dumoulin | 252/312 |
| 4,056,492 | 11/1977 | Merrill | 260/18 S |

FOREIGN PATENT DOCUMENTS

| | | | |
|---|---|---|---|
| 2350410 | 4/1975 | Fed. Rep. of Germany | 524/506 |
| 2609157 | 9/1976 | Fed. Rep. of Germany . | |
| 57-61061 | 4/1982 | Japan | 524/506 |
| 1069275 | 5/1967 | United Kingdom | 524/506 |

Primary Examiner—Joseph L. Schofer
Assistant Examiner—N. Sarofim

[57] ABSTRACT

Water-based silicone resin dispersions are provided comprising a solid organopolysiloxane resin or mixture of resins and a combination of suspending aids including hydroxy-, alkoxy-, or neutralized carboxy polymeric type and non-ionic and/or anionic surfactant as well as an amount of water sufficient for providing a water-based suspension having a desired viscosity and silicone resin solids content by weight, and resistant to settling on prolonged standing.

16 Claims, No Drawings

4,529,758

WATER BASED RESIN DISPERSIONS

BACKGROUND OF THE INVENTION

This invention relates to water-based dispersions of solid organopolysiloxane resins which are useful in coating applications where aqueous media are preferable over traditional organic solvent based systems. The present invention provides both water-based silicone dispersions as well as methods for producing such compositions.

Silicone resins are often selected for applications requiring premium properties. These organopolysiloxane resins are known to offer outstanding endurance to environmental conditions such as weathering and extreme heat and cold. Silicone resins have found utility in a variety of applications such as pressure sensitive adhesives and release coatings. Furthermore, they have been found to be particularly useful in the paint industry which is continually seeking coating formulations which offer premium properties. Silicone resin solutions have previously been used in the paint coatings industry as vehicles and binders which are a necessary part of quality paint formulations.

Heretofore silicone resins were ordinarily supplied to formulators in solutions, that is to say, the resin consisted of so many parts by weight of silicone solids in some organic solvent such as xylene or toluene. However, recently the use of such organic solvents has been discouraged due to escalating costs for organic materials and increased concern for environmental considerations. Organic solvent based silicone resins often required the use of costly and cumbersome pollution abatement procedures and equipment. Thus there has been a trend in recent years for silicone resin systems which are water-based and therefore not dependent upon organic solvents.

However, such silicone resins which have been found to have particular utility in the art of paints and other coatings have often been immiscible or otherwise incompatible with aqueous coating systems. The present invention provides for the first time silicone resins which can be readily made into water-based dispersion compositions thereby providing the beneficial properties of silicone resins without the cumbersome necessity of unduly large amounts of organic solvents.

As noted above, silicone resins are intended as high performance coating vehicles which can be used in high temperature-resistant coatings and will generally outperform conventional organic resins in similar applications. Those skilled in the art will recognize that there are a number of silicone resins which can be utilized in coating applications. Those silicone resins provided in U.S. Pat. Nos. 4,028,339 and 4,056,492 (both issued to Merrill) are examples of resins which can be made part of the water-based dispersed compositions of the present invention. Both of these patents are hereby incorporated by reference.

Previously known silicone resins in water media have been in the form of emulsions. However, such compositions require the use of specialized equipment, such as colloid mills which do not lend themselves readily to dispersing solid silicone resins. It is common practice also to use solvent solutions of the resin for emulsification, and this might be considered a step backward in the quest to comply with newly evolving environmental regulations covering solvent emissions.

The present invention, on the other hand, utilizes a dispersion process system based upon a combination of suspension aids comprising certain polymeric additives and anionic and/or nonionic compounds. The total requirement for the suspension aids of the present invention is generally in the range of approximately 0.5 to 50 percent based upon the weight of the silicone resin solids.

The term "dispersions" as used herein is intended to mean a stable suspension of particulate solid silicone resin in aqueous media. It does not include emulsions. Emulsions are the subject-matter of applicant's earlier filed copending U.S. Ser. No. 229,247 filed Jan. 28, 1981, now abandoned.

It is therefore a primary object of the present invention to provide water-based dispersions of organopolysiloxane resins which are useful in coating formulations.

It is another object to provide a system for dispersing solid silicone resins comprising a combination of cellulosic-or vinyl addition-polymer having pendent hydroxyl, alkoxyl or neutralized carboxyl groups.

It is another object to provide a process for producing water-based silicone resin dispersions.

These and other objects will become apparent to those skilled in the art upon consideration of the accompanying description and claims.

SUMMARY OF THE INVENTION

The water-based silicone dispersions of the present invention are comprised of (a) 100 parts by weight of at least one solid organopolysiloxane resin composition consisting approximately of zero to 50 percent by weight of monofunctional units having the general formula $R_3SiO_{0.5}$, zero to 60 percent by weight difunctional units of the formula $R_2SiO$, zero to 100 percent by weight trifunctional units having the general formula $RSiO_{1.5}$, and zero to 60 percent by weight tetrafunctional units having the general formula $SiO_2$. In the above formulae R represents a substituted or unsubstituted monovalent hydrocarbon radical which will ordinarily be selected from the group consisting of, independently, methyl and phenyl radicals. The organopolysiloxane resins utilized in the present invention will ordinarily have an R to Si ratio of, approximately, 1.0 to 1.99 R groups for each silicon atom. It is to be understood that the present invention contemplates the use of blends of different organopolysiloxane resins in the present dispersions as well as the use of a single type resin for each dispersion. It is required that they be normally solid, at room temperature.

A more particular example of organopolysiloxane resins which are useful in the dispersions of the present inventions are those comprised of, approximately, 0 to 95 percent by weight $CH_3SiO_{1.5}$ units, zero to 35 percent $(CH_3)_2SiO$ units, and 0 to 65% $(C_6H_5)SiO_{1.5}$ units, wherein there is present, approximately, 1.0 to 1.8 organic radicals for each silicon atom.

The water-based dispersions of the above described solid silicone resins are provided by utilizing a combination of suspending aids. The amount of dispersing aid required to form a stable suspension for 100 parts by weight resin solids will vary widely depending upon process conditions and the selection of the remaining constituent ingredients of the dispersion. Those skilled in the art will be able to produce a variety of water-based silicone resin dispersions according to the method set forth herein, and will be able to adjust the amount of suspending aids according to individual desires. Without intending to limit the scope of the present invention in any way, it will ordinarily be the case that, approximately, 0.25 to 50 parts by weight of the combination of dispersing aids will be necessary to produce the water-based silicone resin dispersions of the present invention. It has been discovered by the present inventor that a particular combination of suspending aids is effective for dispersing these silicone resins and thereby providing stable water-based suspensions. The combination of suspending aids comprises 5 to 95 percent by weight of a cellulosic or vinyl addition polymer having pendent hydroxyl, alkoxyl, or neutralized carboxyl groups in combination with 95 to 5 percent of nonionic and/or anionic surfactant. For example, 70 to 75 percent by weight polymeric suspendant and 25 to 30 percent of nonionic and/or anionic surfactant are known to provide satisfactory dispersions in accordance with the present disclosure. Particular examples of each of these types of suspending aids are given later in the specification. When an effective amount of such combinations are blended with the solid organopolysiloxane resins in the presence of water, a water-based silicon resin dispersion can be provided through the utilization of well known suspending techniques such as ball milling. The amount of water is merely dependent upon a desire to provide a preselected silicone resins solids content by weight in the resulting dispersion. As stated, although the amount of water is not critical there will ordinarily be approximately 50 to 300 parts by weight of this water per 100 parts of the solid organopolysiloxane resin.

The process of the present invention provides the above described water based silicone resin stable dispersed compositions by combining the specified constituent ingredients and then applying well known dispersion techniques.

DESCRIPTION OF THE INVENTION

Silicone resins which may be used in the compositions of the present invention may be prepared by a number of well known processes such as, for example, by hydrolyzing an organohalosilane blend wherein the composition of the resin can be varied by changing the proportions of the constituent organohalosilanes to be hydrolyzed. An exemplary resin might start with a blend of about 60 mole percent methyltrichlorosilane, about 35 mole percent of phenyltrichlorosilane and about 5 mole percent of dimethyldichlorosilane in the presence of water, acetone and a water-immiscible organic solvent. In general, this hydrolysis medium could contain from about 1.7 parts to 10 parts of water, 0.2 to 5 parts of acetone and 0.3 to 5 parts of said water-immiscible organic solvent per part by weight of the silane blend.

The various components of the hydrolysis mixture can be added concomitantly or separately in any desired order. Generally, the organohalosilanes are added to the mixture of water, acetone and organic solvent. Preferably, when this method is used a proportion of from 2 to 6 parts of water, about 0.3 to about 2 parts of acetone, and about 0.6 to about 2 parts of organic solvent, per part of the total weight of organosilane blend, is employed. It is preferred that the organohalosilanes are added to the hydrolysis medium, rather than vice versa, as this limits the concentration of hydrochloric acid which is formed during the hydrolysis reaction. A strong hydrochloric acid solution is undesirable in this example as the hydrochloric acid causes acid polymerization of the acetone forming polymerization products which add undesirable color to the product and have a deleterious effect on the physical properties of the product.

A preferred method to prepare organopolysiloxane resins which may be used in this invention is the dual feed process. The dual feed process comprises feeding the blend of organohalosilanes and from about 0.9 to 5 parts, preferably 0.9 to 1.2 parts of acetone from separate containers and through separate conduits, then premixing them immediately prior to hydrolysis. It is necessary to limit the contact time if small amounts of water are present in the acetone or in the atmosphere in contact with the organohalosilanes, as the water present causes hydrolysis of the organohalosilanes generating acid which causes the acetone to polymerize. The initial hydrolysis medium prior to the introduction of the silane blend-acetone mixture contains from about 0 to 4.1 parts of acetone and preferably from 0.9 to 1.2 parts of acetone. The amount of water and organic solvent can be as set forth hereinabove, with preferably from about 3 to 3.5 parts of water and 0.9 to 1.2 parts of organic solvent per part of the total weight of the blend of organohalosilane.

The temperature of the hydrolysis mixture can be controlled by the rate of addition of the reagents, or by external heat or by cooling if desired. During hydrolysis, a temperature of between about 20° C. to about 40° C. is preferred. After the addition of all the reagents is completed, the mixture is generally agitated for an additional period of time such as 15 to 30 minutes or more to allow for complete hydrolysis of the organohalosilanes. The mixture is then allowed to settle and the acid aqueous (bottom) layer is drawn off from the organic layer. Depending upon individual desires, the organic layer can then be stripped of solvent to a solids concentration of 100%. The organic solvent may be stripped under reduced pressure or atmospheric pressure. At this point, the resin may be bodied, i.e., build-up of molecular weight, under total reflux, by condensing and cross-linking silanol units, with the aid of, for example, a catalyst such as iron octoate or Celite (diatomaceous earth) or mixtures thereof, to a desired viscosity, preferably 5–12 cps. at 25° C. at 20% by weight resins solids. Moreover, resin impurities may be removed by filtration, using, for example, filtering aids such as Celite 545 (diatomaceous earth, sold by Johns Manville), Fuller's earth (calcium montmorillonite), and mixtures of the same, or simply by centrifugation. The resulting silanol-containing organopolysiloxane resin has an organo radical to silicon ratio of about 1.05 to 1.

Included among the water-immiscible organic solvents used in the above-described process for providing silicone resins are, for example, hydrocarbons such as benzene, toluene, xylene and the like; esters such as butyl acetate, ethyl acetate, ethers such as diethylether and the like. Toluene is most preferred because it is a good solvent and has a low boiling point. In general, however, any water-immiscible organic solvent, which is inert to the hydrolysis reactants during hydrolysis and in which the hydrolyzate is soluble to provide for its separation from the aqueous layer, may be used.

Of course, through the process provided by the present invention it is now possible to disperse these heretofore water-immiscible resins in aqueous media.

One of the classes of suspending aids required for the water-based silicone resin dispersions of the present invention are cellulose or vinyl addition polymers, e.g., polyvinyl alcohol and/or carboxyvinyl polymers. The latter such products are available, e.g., from Monsanto Plastics and Resins Company under its trademark GELVATOL and from BF Goodrich Chemical Company under its trademark CARBOPOL, respectively. The cellulose additives are derived from cellulose and contain repeating anhydroglucose units. Methylcellulose or cellulose methyl ether is derived from cellulose by conversion to alkali cellulose which is then reacted with methyl chloride. Hydroxypropyl methycellulose or propylene glycol ether is similarly manufactured but utilizes propylene oxide in addition to the methyl chloride reactant.

Additionally, a nonionic water-soluble cellulose ether known as KLUCEL hydroxy propyl cellulose is manufactured by Hercules, Inc. Polyvinyl alcohol is an item of commerce. It is made by hydrolyzing, with acid or base, a polyvinyl ester, usually the acetate. The degree of hydrolysis depends on the conditions. "Completely hydrolyzed" polyvinyl alcohol usually contains approximately 5% residual pendent acetate groups. For the present invention, the extent of residual pendent acetate groups can vary rather widely, e.g., from about 5 to about 80%, but properly from about 5 to about 60%, meaning that the pendent hydroxy content will vary from about 20 to about 95% and preferably from about 40 to about 95%. The carboxy-substituted vinyl addition polymers are likewise items of commerce. Such polymers are typically white powders, having a slight acetic acid odor, and when dispersed in water become viscous when neutralized, e.g., with sodium hydroxide, or the other bases mentioned below: Suitable for purposes of this invention are three materials, CARBOPOL 934,940 and 941. When neutralized and made up in 0.2% solutions, these vary in viscosity by virtue of differences in molecular weight. The 934 generally following in the range of 2,050–5450 Cp; 940 in the range 15,000–35,000 Cp; and 941 in the range 1,950–7,000 Cp in a Brookfield test apparatus run at 20 rpm and 25° C. by well known procedures. A material of the type known as CARBOPOL 941 seems to be especially suitable for purposes of this invention. Ordinarily the order of addition of ingredients is not critical. One suitable method calls for the dispersion of the polymeric agent in water with agitation and heat until the solids are neutralized if necessary. The water phase of the suspending aids can also be added in two, three of more parts, as desired. Ordinarily, from 0.5 to 10.0 parts by weight polymeric agent and 0.1 to 50 parts by weight nonionic and/or anionic surfactant per 100 parts by weight silicone resin solids will be effective for stably suspending such resins in an aqueous system. Those skilled in the art will be able to vary the proportion of the constituent ingredients in order to provide desirable resin formulations.

Additionally, optional ingredients such as formalin can be added to these dispersions depending upon a given desired end use without seriously detracting from the properties of the water-based composition. Examples of typical silicone resins which can be used in the dispersions and processes of the present invention are SR-350 and SR-355 which are available from the General Electric Company.

The composition to be dispersed will then be blended until uniform whereupon the suspension can be induced by ball milling of the composition or by homogenization or blending of the composition.

Standard laboratory ball mills have been found useful for producing laboratory quantities of these water-based resin dispersions. Sand mills and paint mills can also be used. Of course, it is contemplated that those skilled in the art will be able to scale up the process of the present invention in order to produce commercial quantities of these water-based silicone dispersions.

The viscosity of any resulting dispersion can be controlled by varying the amount of water included in the blend. This can best be accomplished by first forming a premix comprised of the polymeric additive and silicone resins along with part of the water. This premix can be milled and remilled until grit-free, and then combined with the surfactant and the remaining water. The accompanying examples demonstrate that the water may also be added in several, e.g., three increments.

The solid organopolysiloxane resins which are utilized in the following examples are comprised primarily of tri-functional units of the formulae, $CH_3SiO_{1.5}$ (T units) and/or $(C_6H_5)SiO_{1.5}$ (T' units); and minor amounts of di-functional units of the formulae $(CH_3)_2SiO$ (D units), and/or $(C_6H_5)_2SiO$ (D' units). Hexyl groups can also be present.

In the description of each resin, the term silane (P.B.W.) refers to parts by weight of the requisite organohalosilane precursor of the resin's functional units. Approximate weight percent silane and mole percent silane values are given for the convenience of those skilled in the art. The weight percent siloxane value is indicative of the approximate number of each type of siloxane units present in an average resin molecule. The R to Si Ratio is an expression used by those skilled in the art to indicate the approximate relative number of organo radicals associated with each silicon atom and is a useful measure of the degree of tri- and di-functionality in such silicone resins.

DESCRIPTION OF THE PREFERRED EMBODIMENT

In order to more fully and clearly describe the present invention, it is intended that the following examples be considered as illustrative rather than limiting the invention disclosed and claimed herein. All parts are by weight.

EXAMPLE 1

A solution of carboxylated vinyl addition polymer (B. F. Goodrich, Carbopol 941) was made by adding 585 g. of water to a one-liter stainless steel beaker equipped with a mechanical stirrer and a hot plate. Slowly was added 3.0 g. of the polymer and the mixture was heated to 50°–60° C. until solution occurred. The solution was cooled to 25° C. and 12 g. of 10% sodium hydroxide solution was added to neutralize and thicken the mixture. The viscosity was 4500 cps.

The silicone resin was a solid, bodied reaction hydrolysis product of a mixture of 98% of methyltrichlorosilane and 2% dimethyldichlorosilane.

To a 1-liter ball mill was added 250 g. of the silicone resin and 250 g. of the polymer solution, and the mixture was ball milled for 24 hours. Water, 250 g., was added and milling was continued for another 24 hours during which grittiness was reduced, but not completely eliminated. There was then added 0.5% of sodium lauryl sulfate and milling was continued for a further 24 hours. The resulting silicone resin dispersion was uniform and had a viscosity of 275 cps., a 5.0 (NS-north scale) Hegman grind and a solids content of 31.5%. When centrifuged for 3 minutes at 3000 rpm, a 40 ml. sample had only 1.5 ml. sediment on the bottom, and no separation on top.

EXAMPLE 2

The procedure of Example 1 was repeated, substituting a different, solid silicone resin.

The silicone resin was a bodied reaction product of 40% methyltrichlorosilane, 56.4% phenyltrichlorosilane and 3.6% dimethyldichlorosilane.

The resulting water base dispersion had a viscosity of 1700 cps, a 2.0 (NS-north scale) Hegman grind, and a solids content of 32.8%. When centrifuged for 30 min. at 3000 rpm, a 40 cc. sample had only 2.0 cc. sediment on the bottom and no separation at the top.

EXAMPLE 3

A solution of carboxylated vinyl addition polymer was prepared by blending 10 g. of carboxy polymer (Carbopol 941) with 2610 g. of water and dissolving. Then 40 g. of 1% sodium hydroxide was added to neutralize the polymer and finally 10 g. of sodium lauryl sulfate (anionic surfactant). Once dispersed, there were added 1320 g. of the powdered resin of Example 2, 10 g. of silica powder and 5 g. of antifoaming agent (General Electric Co., AF-70). The mixture was dispersed with a high speed stirrer and ball milled for 24 hours. The resulting aqueous dispersion of silicone resin was uniform. To 5400 g. of the dispersion was added 500 g. of 0.5% carboxylated vinyl polymer (Carbopol 941), 200 g. of 2% sodium carboxymethyl cellulose (CMC-7H), 10 g. of sodium lauryl sulfate and 2 g. of sodium hydroxide. The dispersion was blended to prepare a uniform product. The final solids content was 28.3%.

Many variations will suggest themselves to those skilled in this art in light of the above, detailed description. For example, instead of the carboxylated vinyl addition polymer, there can be substituted other materials, such as polyvinyl alcohol, carboxymethyl cellulose, mixtures thereof, and the like. Instead of sodium lauryl sulfate, other anionic and nonionic surfactants, such as sodium linear alkyl benzene sulfonate, ammonium lauryl ether sulfate, and/or alkyl polyethylene glycol ether, alkylaryl polyethylene glycol ether, and the like, can be used.

The silicone resins used herein are generally 100% solids, dry, silicone binder resins. With mineral fillers added, they are molded, e.g., to produce electrical components. If paints are to be prepared from such resins, it would be advantageous to use them in the form of solvent solutions or emulsions. Solvent solutions are not desirable because of the need to protect the environment. Emulsions are somewhat difficult to prepare and require special equipment. Therefore, it is obviously advantageous to provide a water based dispersion of the type described in the present invention. The ball milling technique is also advantageous because not only does it facilitate dispersing the resin, but it also allows the addition of coloring agents, filters and extruders, catalysts, and the like conventionally used in paint making. Other mills that accomplish a similar function, like a paint mill, a sand mill, and the like, can also be used. All obvious variations of the present invention are within the full intended scope of the appended claims.

I claim:

1. A stable water-based silicone resin dispersion, comprising:
(a) 100 parts by weight of at least one solid organopolysiloxane resin composition consisting essentially of zero to 50 percent by weight of monofunctional units of the formula $R_3SiO_{0.5}$, zero to 60 percent by weight of difunctional units of the formula $R_2SiO$, zero to 100 percent by weight of trifunctional units of the formula $RSiO_{1.5}$, and zero to 60 percent by weight of tetrafunctional units of the formula $SiO_2$, wherein R is a substituted or unsubstituted monovalent hydrocarbon radical and said organopolysiloxane resin has an R to Si ratio of, approximately, 1.0 to 1.99 R groups for each silicon atom;
(b) 0.25 to 50 parts by weight of a combination of suspension aids per 100 parts by weight of said organopolysiloxane resin, wherein said combination consists essentially of 5 to 95 percent by weight of a cellulosic or vinyl addition polymer having pendent hydroxyl, alkoxyl or neutralized carboxyl groups and 95 to 5 percent by weight of a nonionic surfactant, anionic surfactant, or mixture thereof; and
(c) an amount of water effective for providing a dispersion of said organopolysiloxane resin.

2. A water based silicone resin dispersion as in claim 1 wherein said water is present in an amount effective for providing a dispersion having a preselected silicone resin solids content by weight.

3. A dispersion as in claim 2 wherein said water is present in an amount of, approximately 25 to 400 parts by weight per 100 parts by weight of said organopolysiloxane resin.

4. A dispersion as in claim 1 wherein said monovalent hydrocarbon radicals are selected from, independently, the group consisting of methyl and phenyl radicals.

5. A dispersion as in claim 1 wherein said organopolysiloxane resin consists essentially of, approximately, 0 to 95 percent by weight $CH_3SiO_{1.5}$ units, zero to 35 percent $(CH_3)_2SiO$ units, and 0 to 65 percent $(C_6H_5)SiO_{1.5}$ units, wherein there is present, approximately, 1.0 to 1.8 organic radicals for each silicon atom.

6. A dispersion as in claim 1 wherein said cellulosic or vinyl addition polymer is selected from, methylcellulose, hydroxypropyl methylcellulose, polyvinyl alcohol, neutralized carboxylated vinyl addition polymer and combinations thereof.

7. A dispersion as in claim 1 wherein said nonionic surfactant is selected from the group consisting of alkyl polyethylene ether and alkylaryl polyethylene glycol ether, and the anionic surfactant is selected from the group consisting of sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, ammonium xylene sulfonate, and mixtures of any of the foregoing.

8. A process for providing a water-based silicone resin dispersion, comprising the steps of:
I. combining:
(a) 100 parts by weight of at least one solid organopolysiloxane resin composition consisting essentially of zero to 50 percent by weight of monofunctional units of the formula $R_3SiO_{0.5}$, zero to 60 percent by weight of difunctional units of the formula $R_2SiO$, zero to 100 percent by weight of trifunctional units of the formula $RSiO_{1.5}$, and zero to 60 percent by weight of tetrafunctional units of the formula $SiO_2$, wherein R is a substituted or unsubstituted monovalent hydrocarbon radical and said organopolysiloxane resin has an R to Si ratio of, approximately, 1.0 to 1.99 R groups for each silicon atom;

(b) 0.25 to 50 parts by weight of a combination of suspension aids per 100 parts by weight of said organopolysiloxane resin, wherein said combination consists essentially of 5 to 95 percent by weight of a cellulosic or vinyl addition polymer having pendent hydroxyl, alkoxyl or neutralized carboxyl group and 95 to 5 percent by weight of a nonionic surfactant, anionic surfactant, or mixture thereof, and wherein said combination of agents is effective for maintaining said organopolysiloxane resin in a stable, suspended water based dispersion; and (c) an amount of water effective for providing a dispersion of said organopolysiloxane resin; and II. dispersing a combination of (a), (b) and (c).

9. A porcess as in claim 8 wherein said dispersing step is accomplished by ball milling.

10. A process as in claim 8 further comprising the step of preblending said combination of suspension aids or a portion thereof with a portion of said water prior to combining said agents with said organopolysiloxane resin and a remaining portion of water.

11. A process as in claim 8 wherein said water is present in an amount effective for providing a dispersion having a preselected silicone resin solids content by weight.

12. A process as in claim 11 wherein said water is present in an amount of, approximately, 25 to 400 parts by weight per 100 parts by weight of said organopolysiloxane resin.

13. A process as in claim 8 wherein said monovalent hydrocarbon radicals are selected from, independently, the group consisting of methyl and phenyl radicals.

14. A process as in claim 10 wherein said organopolysiloxane resins consists essentially of, approximately, 0 to 95 percent by weight $CH_3SiO1.5$ units, zero to 35 percent $(CH_3)_2SiO$ units, and 0 to 65 percent $SiO_{1.5}$ units, wherein there is present, approximately, 1.0 to 1.8 organic radicals for each silicon atom.

15. A process as in claim 8 wherein said cellulosic or vinyl addition polymer is selected from methylcellulose, hydroxypropyl methylcellulose, polyvinyl alcohol, neutralized carboxylated vinyl addition polymer and combinations thereof.

16. A process as in claim 8 wherein said nonionic surfactant is selected from the group consisting of alkyl polyethylene glycol ether and alkyl aryl polyethylene glycol ether, and the anionic surfactant is selected from the group consisting of sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, ammonium xylene sulfonate, and mixtures of any of the foregoing.

* * * * *